No. 817,369. PATENTED APR. 10, 1906.
J. C. HAMES.
RACK AND PINION MECHANISM.
APPLICATION FILED DEC. 20, 1904.
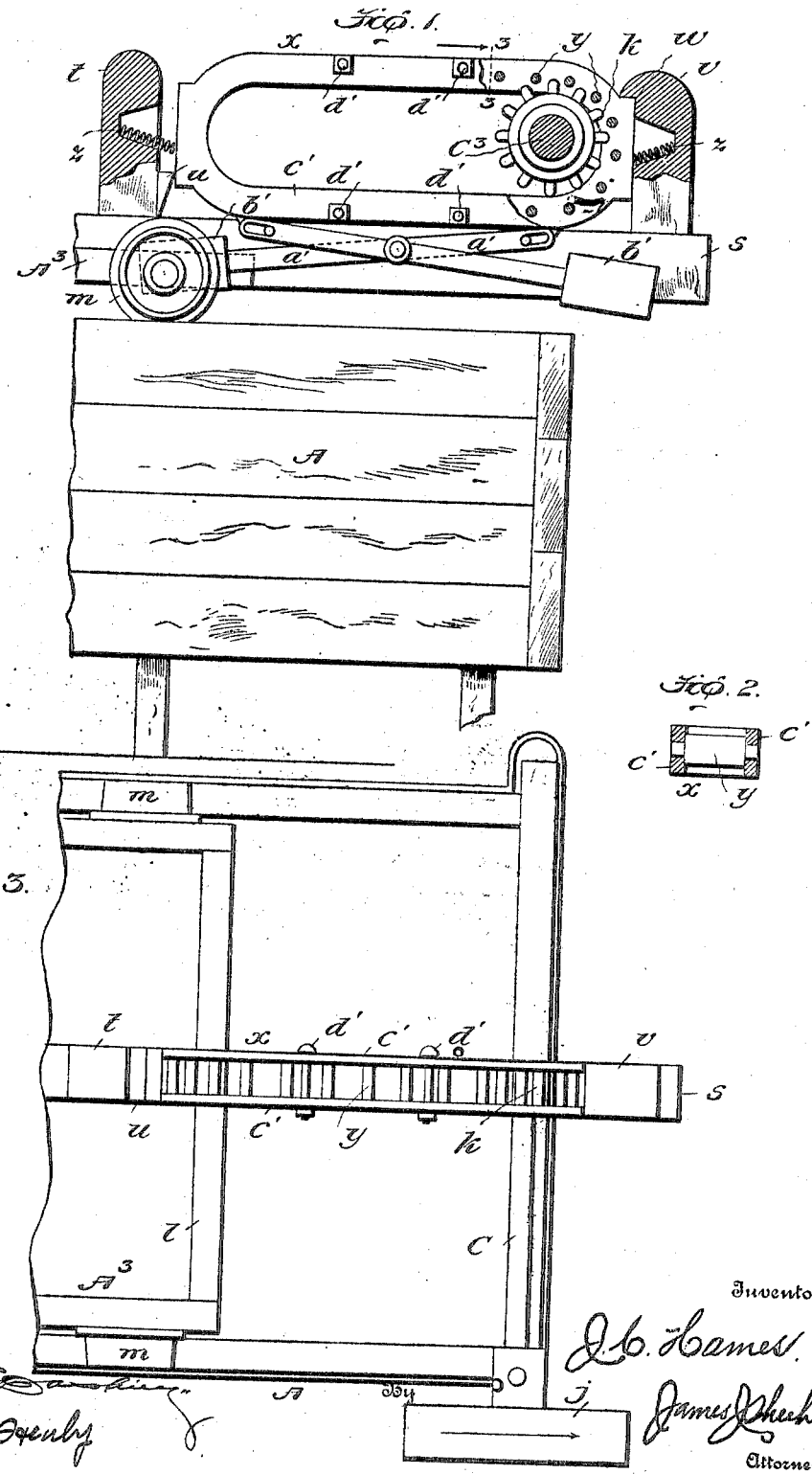

UNITED STATES PATENT OFFICE.

JOSEPH C. HAMES, OF COLORADO CITY, COLORADO.

RACK-AND-PINION MECHANISM.

No. 817,369.  Specification of Letters Patent.  Patented April 10, 1906.

Application filed December 20, 1904. Serial No. 237,624.

*To all whom it may concern:*

Be it known that I, JOSEPH C. HAMES, a citizen of the United States, residing at Colorado City, in the county of El Paso and State of Colorado, have invented new and useful Improvements in Rack-and-Pinion Mechanism, of which the following is a specification.

My invention pertains to rack-and-pinion mechanism, more particularly rack-and-pinion mechanism for operating the agitators of ore-treating apparatus; and it consists in the peculiar and advantageous construction hereinafter described, and particularly pointed out in the claims appended.

In the accompanying drawings, forming part of this specification, Figure 1 is a view, partly in side elevation and partly in section, illustrating my novel mechanism on the tank of an ore-treating apparatus. Fig. 2 is an enlarged detail section taken through the rack of the mechanism in the plane indicated by the line 2 2 of Fig. 1. Fig. 3 is a top plan view showing the tank and my novel mechanism thereon.

Referring by letter to the said drawings, A is the tank. Mounted in suitable bearings on the tank A is a transverse shaft C, bearing a band-pulley $j$ and a pinion $k$, while in the said tank A is arranged a reciprocatory agitator $A^3$, which derives its movement from the shaft C, as will presently be made clear. The said agitator is provided with traveling wheels $m$, arranged on the upper edges of the side walls of the tank A, and it is also provided with a subframe $s$, a post $t$, rising from said subframe $s$ and having a beveled locking-bracket $u$ on its inner side adjacent to its lower end, a post $v$, rising from said subframe and having a beveled locking-bracket $w$ on its inner side adjacent to its upper end, an open rack $x$, arranged longitudinally between the posts $t$ and $v$ and having teeth $y$ arranged to be engaged by the pinion $k$ on the shaft C, coiled springs $z$, disposed in pockets in the inner sides of the posts $t$ and $v$ and connecting the ends of the rack $x$ to said posts, and levers $a'$, pivotally connected together and having inner arms pivotally connected in a loose manner to the lower portion of the rack $x$, and outer arms bearing counterbalance-weights $b'$. The rack $x$ *per se* may be an open rack of any construction compatible with the purposes of my invention without involving a departure from the scope thereof. I prefer, however, to have the said rack comprise side frames $c'$, (best shown in Fig. 3,) teeth $y$, interposed between the said side frames and having reduced ends removably arranged therein, and transverse bolts $d'$ connecting the said side frames at suitable intervals in the length thereof. In virtue of this construction it will be seen that when any one of the teeth $y$ is worn or otherwise impaired the said tooth may be readily removed from the rack and as readily replaced with a new tooth without affecting the other teeth. It will also be observed that the teeth $y$ are adapted to roll on their axes in the side frames, and hence there is but a minimum amount of friction between the said teeth and the teeth of the pinion.

In the practical operation of my novel mechanism the shaft C is continuously rotated in the direction indicated by arrow in Fig. 1, and hence it will be observed that when the teeth of the pinion $k$ are in mesh with the lower series of teeth of the rack $x$ the agitator will be moved as a whole toward the left, while when the teeth of the pinion are in mesh with the upper series of teeth of the rack the agitator as a whole will be moved toward the right. It will also be observed that at the completion of the action of the pinion against the lower series of teeth of the rack to move the agitator toward the left the right-hand end series of teeth in the rack will come into engagement with the teeth of the pinion, with the result that the pinion will force the right-hand end of the rack downwardly and under the locking-bracket $w$ of the post $v$ and will then engage the upper series of rack-teeth, while at the completion of the action of the pinion against the upper series of rack-teeth to move the agitator toward the right the left-hand end series of teeth in the rack will come into engagement with the teeth of the pinion, with the result that the pinion will force the left-hand end of the rack upwardly and over the locking bracket or lug $u$ on the post $t$. Incident to the described operation of the rack $x$ in connection with the pinion $k$ the weights $b'$ on the levers $a'$ serve to hold the rack parallel to the travel while the springs $z$ serve as centers to hold the rack steady and also assist in the upward and downward movements of the rack and operate to relieve the agitator of shock when the direction of movement of the same is reversed. The locking-brackets $u$ and $w$ and the ends of the rack $x$, with which said brackets coöperate, are clearly shown in Fig. 1. The locking-bracket $u$ serves when the end of the rack $x$ at the left is forced upwardly by pinion $k$ to hold the left portion of the rack against downward movement with a view of assuring the pinion properly engaging the upper series of rack-teeth during the movement of the rack toward the right, while the locking-bracket $w$ serves when the end of the rack $x$ at the right is forced downwardly by pinion $k$ to hold the right portion of the rack against upward movement, so as to assure the pinion properly engaging the lower series of rack-teeth during the movement of the rack toward the left. When the pinion $k$ forces one end of the rack $x$ into engagement with one locking-bracket, it will obviously operate to disengage the opposite end of the rack from the other locking-bracket.

Having described my invention, what I claim, and desire to secure by Letters Patent, is—

1. The combination of a pinion having a fixed center of movement, a reciprocatory and laterally-movable open rack having upper and lower and end series of teeth arranged to be engaged by the pinion, posts arranged adjacent to the ends of the rack, and coacting means on the rack and posts for yieldingly retaining the ends of the former.

2. The combination of a pinion having a fixed center of movement, posts having lower and upper locking-brackets, respectively, and an open rack carried by the posts and interposed between and movable vertically with respect to said posts and having upper and lower and end series of teeth arranged to be engaged by the pinion, yielding connections between the open rack and the posts, and means for yieldingly holding the rack parallel to its travel.

3. The combination of a pinion having a fixed center of movement, posts having lower and upper locking-brackets, respectively, an open rack interposed between and movable vertically with respect to said posts and having upper and lower and end series of teeth arranged to be engaged by the pinion, coiled springs connecting the ends of the rack and the posts, and levers pivotally connected together and having upper arms connected to the lower portion of the rack, and lower arms bearing weights.

4. The combination of a pinion having a fixed center of movement, traveling wheels, and an open rack carried by and movable vertically with respect to said wheels and receiving and arranged to be engaged by the pinion.

5. The combination of a pinion, an open rack containing and arranged to be engaged by the pinion and comprising side frames detachably connected together and teeth interposed and secured between the connected frames and adapted to be removed therefrom when the frames are disconnected, posts arranged adjacent to the ends of the rack, and coacting means on the rack and posts for yieldingly retaining the ends of the former.

6. A pinion having a fixed center of movement, in combination with a reciprocatory and laterally-movable open rack receiving the pinion and having longitudinal and end series of teeth arranged to engage the same, means for yieldingly holding the said rack parallel to its travel, means for temporarily holding the ends of the rack against lateral movement, and yielding connections between said rack and the holding means.

In testimony whereof I have hereunto set my hand in presence of two subscribing witnesses.

JOSEPH C. HAMES.

Witnesses:
B. F. CLARK,
EARL C. HEINLY.